United States Patent [19]
Erbes

[11] Patent Number: 5,752,807
[45] Date of Patent: May 19, 1998

[54] JET PUMP SENSING LINE REPAIR

[75] Inventor: John Geddes Erbes, Mt. View, Calif.

[73] Assignee: General Electric Company, San Jose, Calif.

[21] Appl. No.: 669,733

[22] Filed: Jun. 26, 1996

[51] Int. Cl.$^6$ ................................. F04B 21/00; F04F 5/00
[52] U.S. Cl. ........................ 417/63; 417/151; 411/84; 248/62; 248/67.5; 248/74.4
[58] Field of Search ................. 417/151, 63; 248/228.6, 248/230.1, 230.6, 231.61, 231.71, 62, 67.5, 74.4, 73; 411/84, 85, 400, 551

[56] References Cited

U.S. PATENT DOCUMENTS

| | | | |
|---|---|---|---|
| 1,877,781 | 9/1932 | Akerlund | 248/74.4 |
| 2,805,105 | 9/1957 | Brasher | 411/400 |
| 3,445,335 | 5/1969 | Gluntz | 417/151 |
| 3,856,244 | 12/1974 | Menshen | 248/67.5 |
| 4,468,172 | 8/1984 | Dixon et al. | 417/151 |
| 5,076,748 | 12/1991 | Waterfield et al. | 411/84 |

*Primary Examiner*—Charles G. Freay
*Attorney, Agent, or Firm*—James E. McGinness; Dennis M. Flaherty

[57] ABSTRACT

A remotely installable piping support attachment employs a T-bolt type of blind fastener for clamping a relatively smaller instrumentation pipe, e.g., the jet pump sensing line, to the wall of an adjacent structure, e.g., the inlet mixer diffuser. The attachment assembly includes a T-bolt, a split pipe clamp support, a ratchet nut with peripheral ratchet teeth, and a ratchet lock washer. The head of the T-bolt is inserted through an elongated hole machined in the diffuser wall and then rotated so that the T-bolt head cannot pass back through the elongated hole. When the nut is tightened on the threaded shank of the T-bolt, a top plate and an anchor of the split pipe clamp support are pressed together to clamp the jet pump sensing line therebetween. The ratchet lock washer is counterbored for receiving the nut and slotted to provide an integral spring arm encircling the nut. A short length of the inside of the spring arm end has a ratchet tooth contour which engages the ratchet tooth contour on the periphery of the nut. The ratchet lock washer also has a key which engages a groove in the top plate, thereby preventing rotation of the lock washer relative to the top plate. The meshing of ratchet teeth in turn blocks rotation of the nut in the direction of loosening.

19 Claims, 8 Drawing Sheets

JET PUMP SENSING LINE REPAIR

FIELD OF THE INVENTION

This invention relates to maintenance and repair of nuclear reactors. In particular, the invention relates to the repair of the pressure sensing lines mounted on the jet pump assemblies in a boiling water reactor.

BACKGROUND OF THE INVENTION

Figure 1:
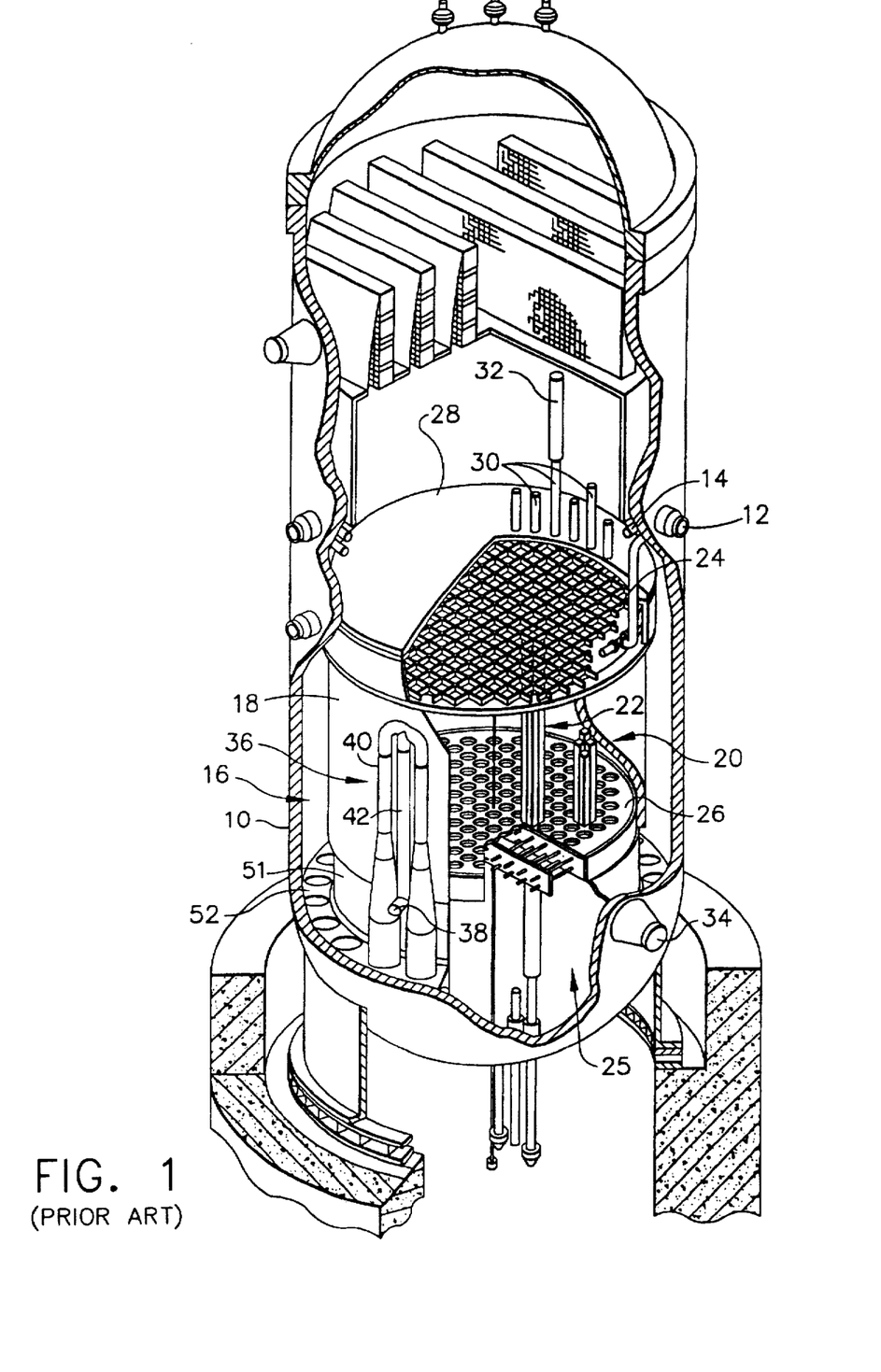
FIG. 1 is a schematic showing a partially cutaway perspective view of a conventional BWR.

One type of conventional boiling water reactor (BWR) is shown in FIG. 1. During operation of the reactor, coolant water circulating inside a reactor pressure vessel (RPV) 10 is heated by nuclear fission produced in the nuclear fuel core 20. Feedwater is admitted into the RPV 10 via a feedwater inlet 12 and a feedwater sparger 14. The feedwater flows downwardly through the downcomer annulus 16, which is an annular region between RPV 10 and a core shroud 18.

The core shroud 18 is a stainless steel cylinder which surrounds the nuclear fuel core 20. The fuel core is made up of a multiplicity of fuel bundle assemblies 22 (only two 2×2 arrays of which are shown in FIG. 1). Each array of fuel bundle assemblies is supported at the top by a top guide 24 and at the bottom by a core plate 26.

The coolant water flows downward through the downcomer annulus 16 and into the core lower plenum 25. The water in the lower plenum in turn flows upward through the fuel core 20. In particular, water enters the fuel assemblies 22, wherein a boiling boundary layer is established. A mixture of water and steam exits the fuel core and enters the core upper plenum under the shroud head 28. The steam-water mixture then flows through standpipes 30 on top of the shroud head 28 and enters the steam separators 32, which separate water from steam. The water is recirculated back to the downcomer annulus and the steam flows out of the RPV and to the gas turbines (not shown).

The BWR also includes a coolant recirculation system which provides the forced convection flow through the core necessary to attain the required power density. A portion of the water is sucked from the lower end of the downcomer annulus 16 via recirculation water outlet 34 and forced by a centrifugal recirculation pump (not shown) into a plurality of jet pump assemblies 36 (only one of which is shown) via recirculation water inlets 38. The jet pump assemblies are circumferentially distributed around the core shroud 18 and provide the required reactor core flow. A typical BWR has 16 to 24 inlet mixers.

As seen in FIG. 1, a conventional jet pump assembly comprises a pair of inlet mixers 40. Each inlet mixer has an elbow welded thereto which receives pressurized driving water from a recirculation pump (not shown) via an inlet riser 42. An exemplary inlet mixer comprises a set of five nozzles circumferentially distributed at equal angles about the inlet mixer axis. Each nozzle is tapered radially inwardly at its outlet. The jet pump is energized by this convergent nozzle. Five secondary inlet openings are radially outside of the nozzle exits. Therefore, as jets of water exit the nozzles, water from the downcomer annulus is drawn into the inlet mixer 40 via the secondary inlet openings, where it is mixed with water from the recirculation pump. The water then flows into the diffuser 44.

Each jet pump assembly has a sensing line pipe 48 (shown in FIG. 2) which is in fluid communication with a plurality of pressure taps at the top of the diffuser 44 and with instrumentation (not shown) located outside the reactor pressure vessel. These sensing lines allow the core flow to be measured and monitored. The flow through and outside the jet pump assemblies contains pressure fluctuations from various sources in the reactor system. These pressure fluctuations can have frequencies close to one or more natural vibration modes of the sensing line piping. These vibration modes depend on the spacing and stiffness of existing welded supports that attach the sensing line piping to the diffuser. When an excitation frequency happens to be too close to matching the piping natural frequency at some particular location, vibration of the piping exerts loads on its support attachments which have caused cyclic fatigue cracking and failure of both the piping and its welded attachments to the supports. This can result in loss of the indication of core flow, which if it occurs at enough locations, may require plant shutdown.

Various solutions to the problem of jet pump sensing line failure have been proposed. For example, it is known to install ring clamps and C-clamp supports where required to modify the sensing line natural frequencies so they do not match up with reactor system excitations. These clamps surround the jet pump diffuser and clamp the sensing line tightly to a spacer fitted against the diffuser wall. To allow access for their installation generally requires disassembly of the jet pumps, which is an undesirable expense and extension of the reactor outage length. Furthermore, the size of the clamps added more obstructions to other maintenance and repair work in the already limited downcomer annulus access. Also, the relatively large ring configurations could add new vibration modes of their own which could be excited by the system frequencies.

Another solution used two bolts and a back plate to attach a local pipe clamping assembly through holes machined in the diffuser wall. The bolts in this design were locked by tack welds, requiring complex tooling and undesirable expense to perform remotely underwater. While occupying a much smaller space envelope, this design still requires jet pump disassembly and adds a significant mass on the vibrationally "noisy" diffuser wall, which was otherwise unsupported. Therefore, it also could add new diffuser vibration modes which could be excited by the system frequencies.

With respect to the need for remote bolt locking, previous practice in reactor applications has commonly relied on either tack welding or various bent tab or crimped sleeve configurations. Such bolt locking techniques are disfavored for permanent installations, due to concerns about stress corrosion failures from residual stress and cold work.

SUMMARY OF THE INVENTION

The present invention is a remotely installable piping support attachment comprising a T-bolt type of blind fastener for clamping a relatively smaller instrumentation pipe, e.g., the jet pump sensing line, to the wall of an adjacent structure, e.g., the inlet mixer diffuser. The invention overcomes the aforementioned disadvantages of prior art jet pump sensing line repair hardware by providing a compact piping support which can be rigidly attached to the wall of the diffuser without disassembling the jet pump assembly. These remotely installable sensing line supports have a minimum size and mass and require minimum installation time.

The design features which were developed to accomplish the foregoing can be separated into two parts: the T-bolt clamp support and the spring ratchet locking device used to keep it from loosening. Considered separately, both features have applications other than their use in jet pump sensing line repair.

3

Figures 2, 3:
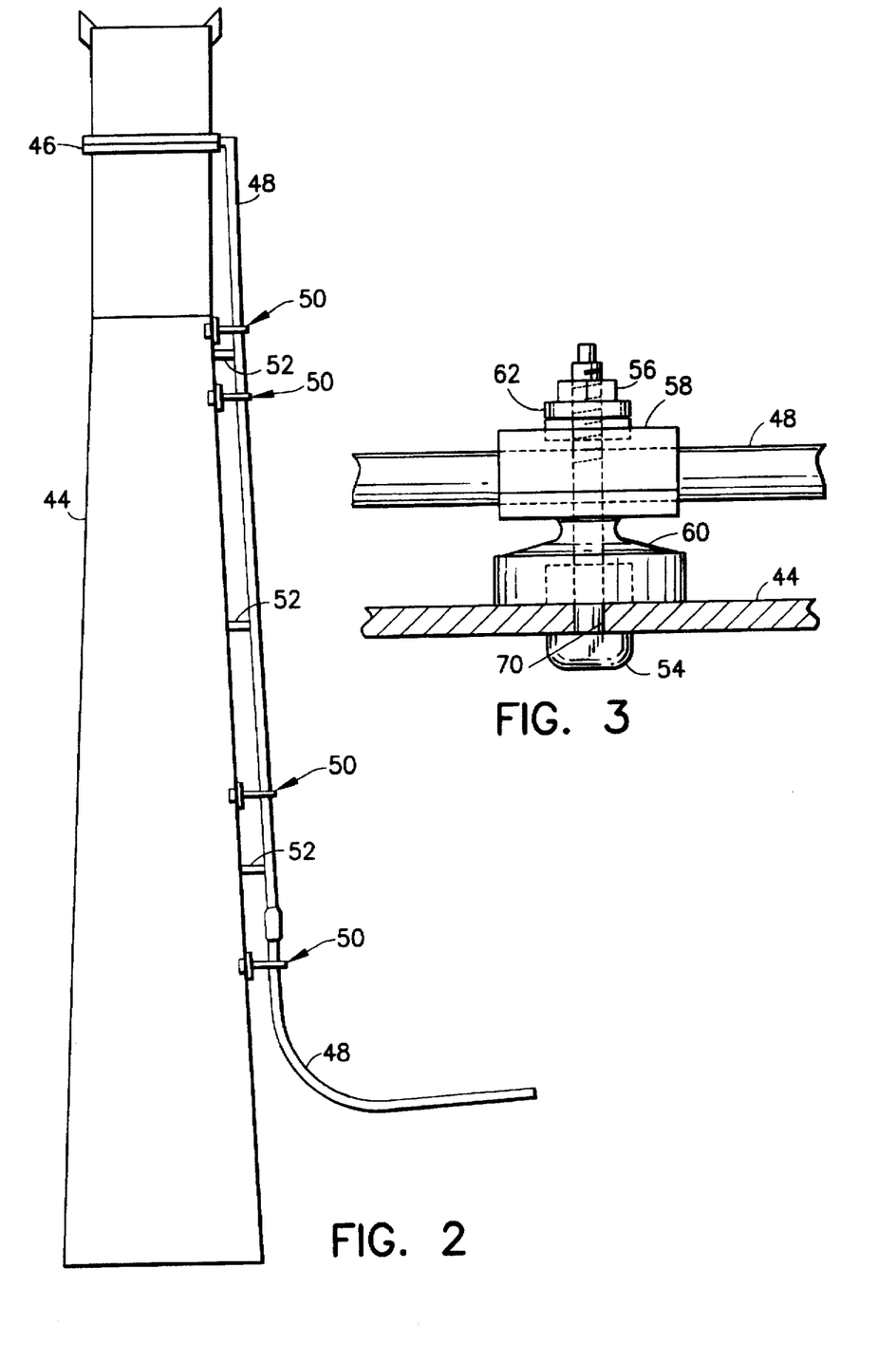
FIG. 2 is a schematic showing an elevation view of a jet pump sensing line attached to a diffuser by means of the repair hardware of the present invention.
FIG. 3 is a schematic showing an elevation view of the jet pump sensing line attachment assembly in accordance with a preferred embodiment of the invention, with the diffuser wall sectioned to reveal the head of the T-bolt inside the diffuser.

In accordance with a preferred embodiment of the invention, the T-bolt clamp support shown in FIG. 3 comprises a T-bolt, a split pipe clamp support, and a ratchet nut with peripheral ratchet teeth. The preferred material in this application is Ni—Cr—Fe alloy X-750, giving high strength to allow minimum size, resistance to thread galling and good corrosion resistance in the BWR environment. The T-bolt head is elongated with radiused ends, and has a width in the narrow direction equal to the bolt shank diameter. The bolt shank has a square neck for a short length adjacent to the head, as with a common carriage bolt. The bolt is threaded at the opposite end, and has a small T-handle end for gripping by an installation tool. The ratchet nut has a hex socket drive and a ratchet tooth contour around its periphery.

The ratchet locking device comprises a washer which seats under the nut. The ratchet lock washer is counterbored for receiving the nut and slotted to provide an integral spring arm encircling the nut. A short length of the inside of the spring arm end has a ratchet tooth contour which engages the ratchet tooth contour on the periphery of the nut. Machining of the relatively complex lock washer slotting is made practical by a precision process known as computer numerically controlled wire electrodischarge machining.

In accordance with the preferred embodiment of the invention, the bottom of the lock washer has a protruding key which engages a mating slot in the top of the split clamp to prevent rotation of the washer. The bottom of the upper split clamp part has a radiused groove on one side to fit the sensing line, and a downward projecting lip on the opposing side. The lip mates against a recess on one side of the lower split clamp part, preventing its rotation, and seating on a ledge which provides a fulcrum for transfer of clamp preload to the jet pump sensing line. The lower clamp part also has a radiused groove on one side to fit the sensing line, with an extending tapered projection to facilitate its sliding into engagement with the sensing line during remote assembly. The bottom of the lower clamp part is machined to match the curvature of the mating diffuser wall and the spacing from the wall to the sensing line.

Installation is accomplished with all the components preassembled and held in a special tool. The ratchet nut is positioned at the end of the T-bolt, and the split clamp is separated to accept the pipe. The tool holds the T-bolt such that its head is retracted flush within a recess in the clamp base, oriented horizontally. The lower clamp part recess may also contain a square opening to accept the square neck of the T-bolt, thereby preventing it from rotating until the T-bolt has been inserted through a horizontally oriented slot machined through the wall of the jet pump diffuser, typically using electrodischarge machining. The slot in the diffuser wall is sized to provide clearance for insertion of the T-bolt head, which has an oval cross section. The clamp assembly is first slid between the pipe and diffuser. The tool then pushes the T-bolt head and square neck through the slot in the diffuser wall, and rotates it one quarter turn so the T-bolt head is oriented vertically. The tool then retracts the T-bolt, engaging its square neck in the diffuser wall slot so it cannot rotate and seating the bolt head on the inside surface of the diffuser. The small cross-sectional area, radiused ends and orientation of the T-bolt head parallel to the diffuser flow results in a smaller disturbance of the flow than the prior art design in which a back plate is installed inside the diffuser.

The lock washer spring arm has a tab extending upward from the ratchet contoured end that is positioned so engagement of the tool's nut drive socket deflects the spring arm radially outward. This disengages the spring arm ratchet from the nut, facilitating either tightening or loosening of the

4 nut. The tool completes installation by tightening the nut to a predetermined torque, clamping the assembly and the pipe securely to the diffuser. The preloaded close fitup of the clamp base contour to the diffuser also assures the jet pump flow leakage effect will be very small. Removal of the tool allows engagement of the spring arm ratchet with the teeth on the nut, limiting subsequent rotation in the loosening direction to less than one tooth space. No separate installation operations are required to lock the nut. The unlocking torque strength is enhanced by contact at the end of the spring arm, as it is forced against the fixed opposing surface of the slot. Use of a fine thread and close tooth spacing minimizes the corresponding possible variation in preload.

DETAILED DESCRIPTION OF THE PREFERRED EMBODIMENT

Referring to FIG. 2, each jet pump assembly 36 is fitted with a collector ring 46 having a plurality of pressure taps (not shown). These pressure taps are connected by sensing line piping 48 (e.g., having an outer diameter of 0.54 inch) to outside instrumentation (not shown), allowing necessary measurement and monitoring of the core flow.

The sensing line piping is attached to a jet pump diffuser 44 by means of a plurality of existing standoff brackets 52. In accordance with the repair technique of the present invention, the sensing line piping 48 can be additionally supported from the diffuser by means of a plurality of T-bolt clamp assemblies 50 located in between the existing brackets 52.

A T-bolt clamp assembly 50 in accordance with the preferred embodiment of the invention is shown in more detail in FIG. 3. Each T-bolt clamp assembly 50 comprises a T-bolt 54 and a ratchet nut 56 which are threadably engaged to attach a split pipe clamp support to a jet pump diffuser 44. The split pipe clamp support comprises an upper clamp part, i.e., top plate 58, and a clamp base, i.e., anchor 60, which clamp the sensing line piping 48 when the ratchet nut 56 is tightened on the T-bolt 54. The diffuser wall is sandwiched tightly between a head 54a of the T-bolt 54 and a contact surface of anchor 60. The contact surface of anchor 60 is machined to have a curvature which matches the external curvature of the abutting portion of the diffuser, providing intimate contact to minimize leakage and maximize support rigidity.

In accordance with a further feature of the invention, a ratchet lock washer 62 is installed between the clamp top plate 58 and the ratchet nut 56. The ratchet lock washer has a series of ratchet teeth which engage opposing ratchet teeth on the periphery of nut 56, thereby locking the nut against rotation in the direction of loosening.

Figure 4A:
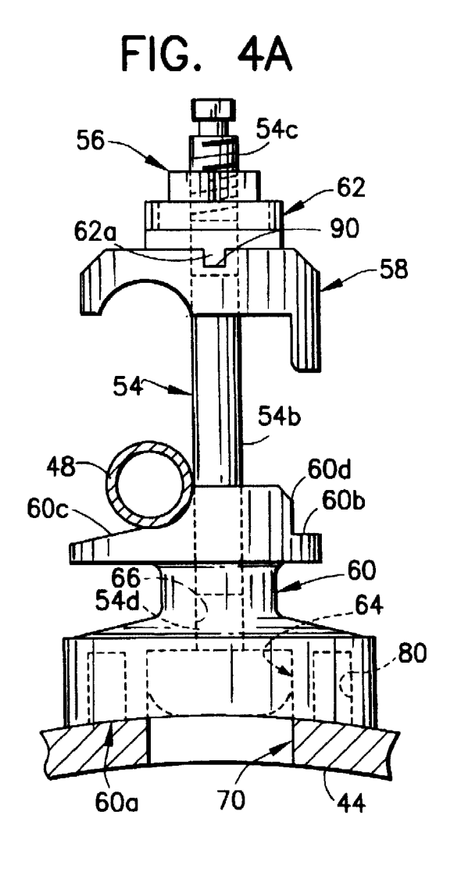
FIGS. 4A–4C are schematics showing elevation views (taken 90° removed from the elevation view in FIG. 3) of the jet pump sensing line attachment assembly in accordance with the preferred embodiment at three stages of installation, with the sensing line and the diffuser wall sectioned.
Figure 4B:
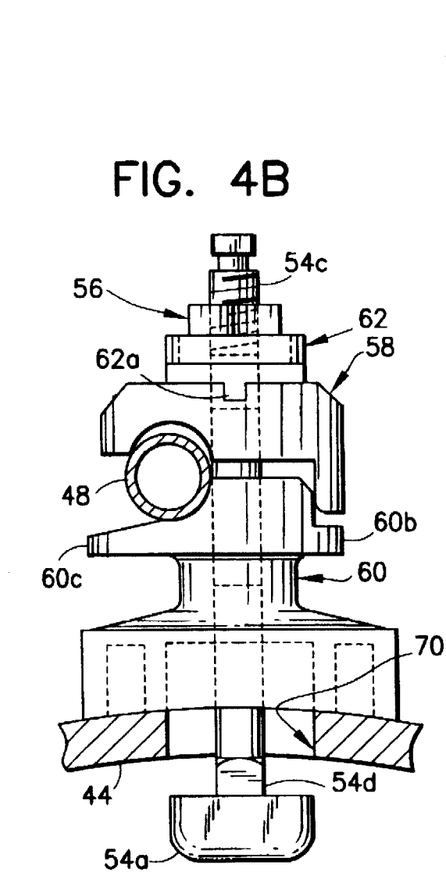
Figure 4C:
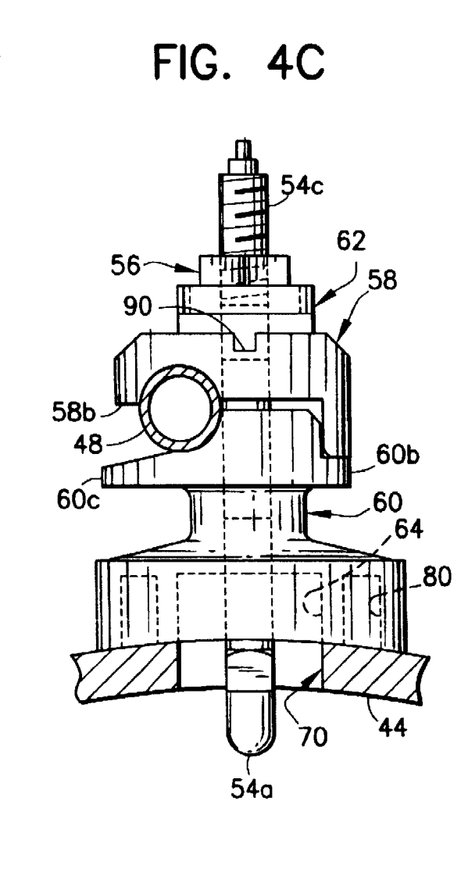

The manner in which the T-bolt clamp assembly 50 is installed on the diffuser is illustrated in FIGS. 4A–4C. Installation is accomplished with all the components preassembled and held in a special tool. As seen in FIG. 4A, the assembly is lowered into position with the head 54a of the T-bolt residing in a recess formed in the base 60a of the anchor 60. The ratchet nut 56 is screwed onto the threaded end of T-bolt 54, with lock washer 62 coupled to the nut and with the clamp top plate 58 in turn coupled to the lock washer. The top plate 58 and anchor 60 of the split clamp are separated to accept the sensing line pipe 48, as shown in FIG. 4A.

Figure 10A:
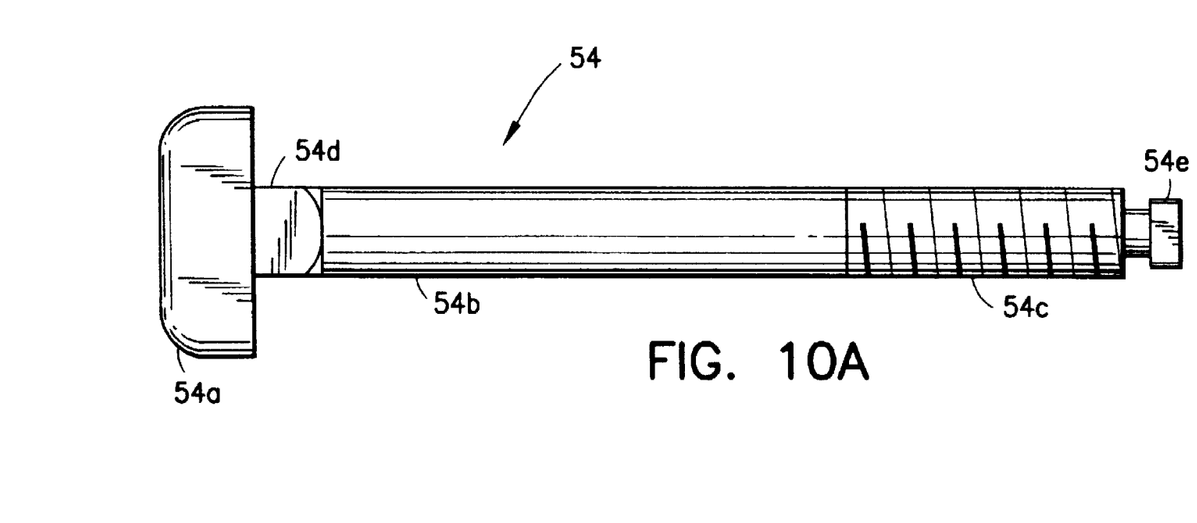
FIGS. 10A–10C are schematics showing top plan and elevation views respectively of the ratchet lock washer in accordance with the preferred embodiment, the elevation view of FIG. 10C being taken at 90° removed from the elevation view of FIG. 10B.
Figure 10B:
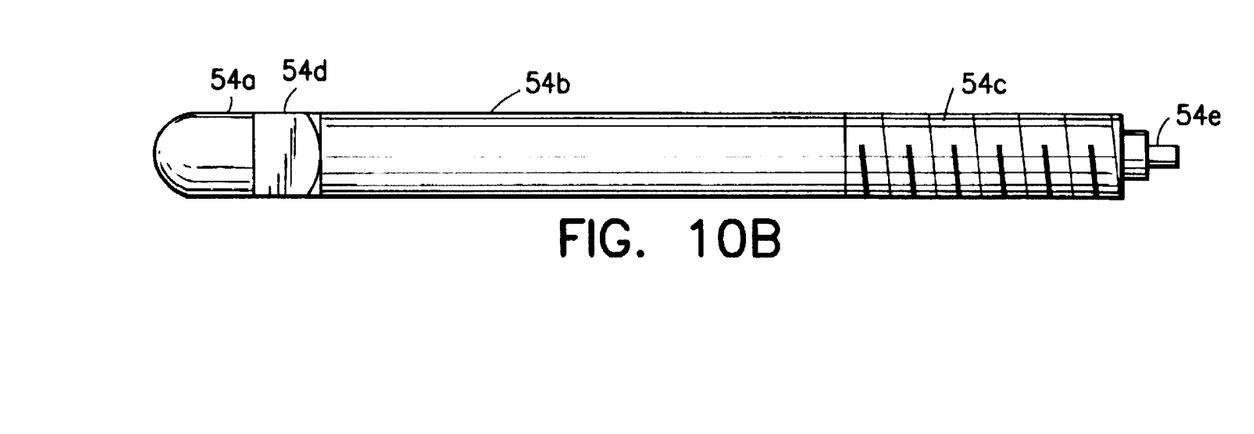
Figure 10C:
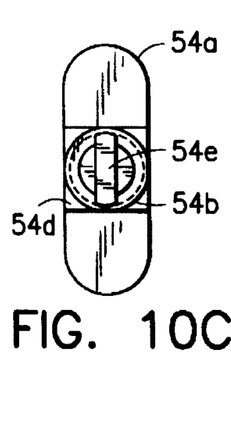

As shown in FIGS. 10A–10C, the head 54a of T-bolt 54 is elongated with parallel sides and semicircular ends to provide an oval cross section. (Alternatively, the cross section could be a rectangle with radiused corners or any other suitable streamlined shape.) All edges along the top perimeter of the bolt head 54a are radiused. The width separating the parallel sides of the bolt head may be equal to the diameter of the bolt shank 54b, the distal end 54c of which is threaded. The bolt shank has a square neck 54d for a short length adjacent to the head 54a. The square neck has a side length equal to the width of the bolt head 54a. The bolt also has a small T-handle end 54e for gripping by an installation tool.

Before the sensing line repair assembly in accordance with the invention can be installed, an elongated hole or slot 70 (best seen in FIG. 4A) is formed, e.g., by electrodischarge machining, in the wall of diffuser 44 at the desired elevation. Preferably, slot 70 is oriented generally horizontal, i.e., perpendicular to the direction of water flow inside the diffuser. The T-bolt 54 has an elongated head having a length less than the length of slot 70 and a width less than the width of slot 70. When the bolt head is aligned with slot 70, the bolt head can pass through the slot and into the diffuser. The T-bolt is displaced axially until the square neck 54d clears the slot 70. Then the T-bolt 54 is rotated 90° to the position depicted in FIGS. 3 and 4C. The length of the bolt head 54a is greater than the width of slot 70, so that when T-bolt 54 is rotated 90°, the head cannot pass back out the diffuser, thereby coupling the sensing line repair assembly to the diffuser.

Figure 9A:
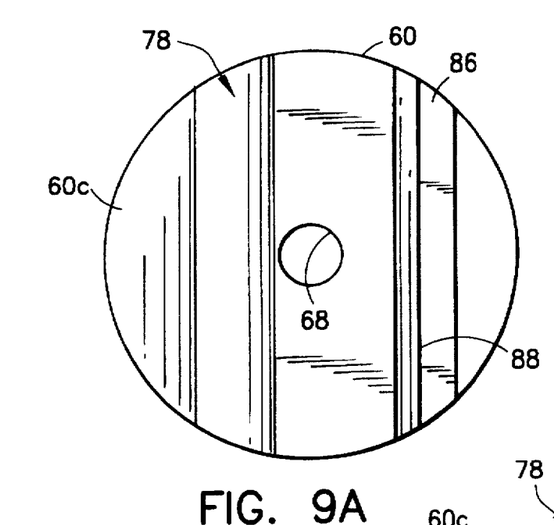
FIGS. 9A and 9B are schematics showing top plan and elevation views respectively of the clamp anchor in accordance with the preferred embodiment.
Figure 9B:
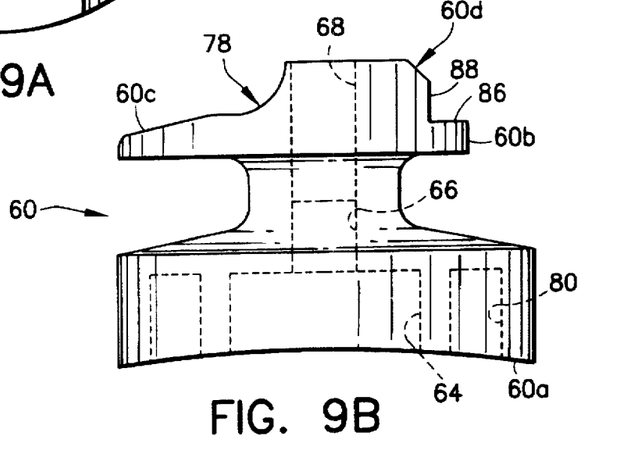
Figure 9C:
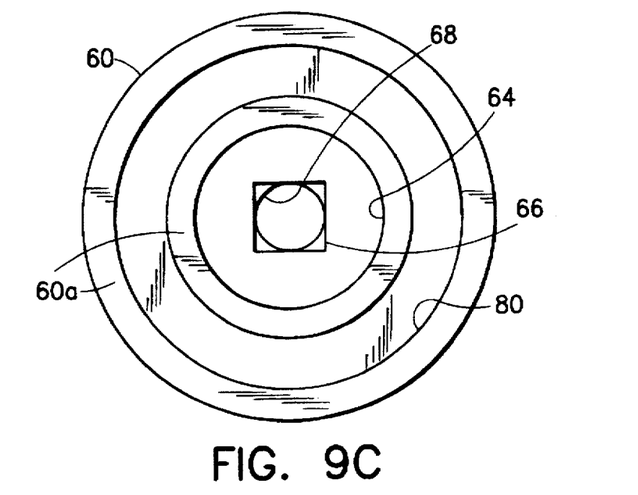
FIG. 9C is a schematic showing a bottom plan view of the clamp anchor in accordance with the preferred embodiment.

During insertion of the T-bolt head into the diffuser slot, the installation tool (not shown) holds the T-bolt 54 such that its head 54a is retracted flush within a circular recess 64 in anchor 60 (see FIGS. 9B and 9C) and oriented horizontally, i.e., aligned with the slot. The recess 64 in clamp anchor 60 communicates with a square opening 66, which accepts the square neck 54d of the T-bolt 54 (see FIGS. 10A–10C). The square opening 66 in turn communicates with a circular unthreaded hole 68 which receives the T-bolt shank 54b. The interlocking of the square neck 54d with the square opening 66 blocks the T-bolt 54 from rotating relative to the anchor, so that the T-bolt head can be aligned with the horizontal slot 70. Optionally, an annular recess 80 is formed in the anchor base, concentric with circular recess 64. A sealing ring (not shown) can be inserted in recess 80 to reduce leakage through slot 70. Recess 80 also serves to reduce the weight of the anchor.

Preferably the width of square neck 54d is equal to the width of the head 54a, as seen in FIGS. 10B and 10C. As previously described, the slot 70 in the diffuser wall is sized to provide clearance for insertion of the T-bolt head 54a. The slot may have an oval shape similar to that of the bolt head 54a, with a width only slightly greater than the width of the square neck 54d of the T-bolt. Alternatively, slot 70 can be generally rectangular.

As shown in FIG. 4A, during installation the anchor 60 of the T-bolt clamp assembly 50 is first slid between the sensing line pipe 48 and the diffuser 44 so that its curved contact surface 60a abuts the diffuser in the region surrounding the slot 70. The installation tool is then manipulated to push the T-bolt head 54a and square neck 54d out of the anchor recess 64 and through the slot 70 in the diffuser wall until the square neck 54d clears the slot 70, as shown in FIG. 4B. This same motion brings the top plate 58 into or nearly into clamping contact with the sensing line piping 48.

When the square neck 54d is clear of the slot 70, the T-bolt is rotated one quarter turn (by remote manipulation of the installation tool) so the T-bolt head is now oriented vertically, i.e., parallel to the direction of water flow inside the diffuser. The tool then retracts the T-bolt 54, engaging its square neck 54d in the diffuser wall slot 70 so the bolt cannot rotate relative to the diffuser. The T-bolt is retracted until the bolt head 54a seats on the inside surface of the diffuser, as shown in FIG. 4C. The small cross-sectional area, semicircular ends and radiused edges, and orientation of the T-bolt head parallel to the diffuser flow minimizes the disturbance to the flow when the clamp assembly is installed.

Figure 6A:
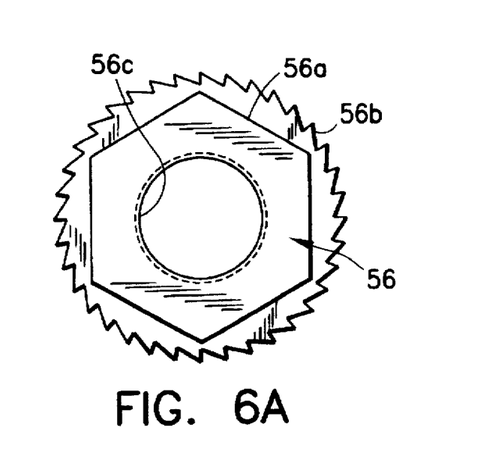
FIGS. 6A and 6B are schematics showing top plan and elevation views respectively of the ratchet nut in accordance with the preferred embodiment.
Figure 6B:
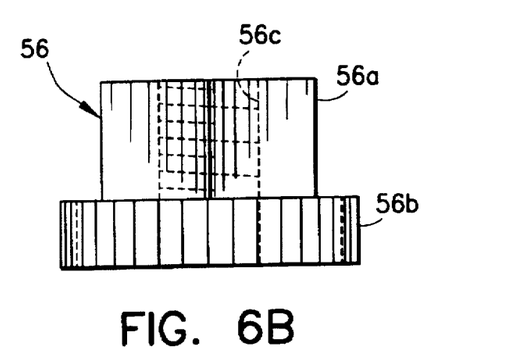

With the T-bolt head 54a aligned vertically and the square neck 54d inserted in the slot 70, a nut drive socket in the special installation tool is operated remotely to rotate the ratchet nut 56 in the direction of tightening. As seen in FIGS. 6A and 6B, the ratchet nut 56 has a hex socket drive 56a and a ratchet tooth contour 56b around its periphery. A threaded hole 56c is coupled to the threaded portion 54c of bolt shank 54b. As the ratchet nut is rotated in the direction of tightening, the nut transfers a clamping load to the top plate 58, which in turn clamps the sensing line pipe 48 against the anchor 60, as seen in FIG. 4C.

Figure 8A:
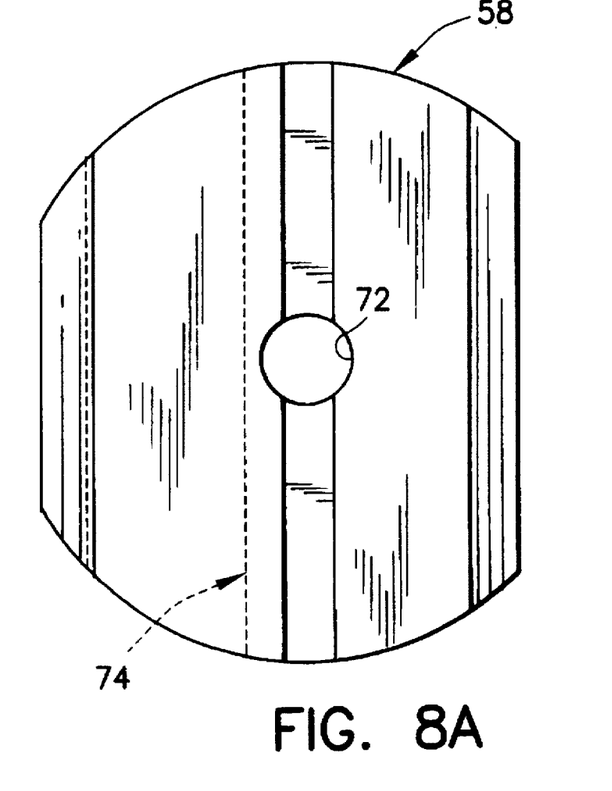
FIGS. 8A and 8B are schematics showing top plan and elevation views respectively of the clamp top plate in accordance with the preferred embodiment.
Figure 8B:
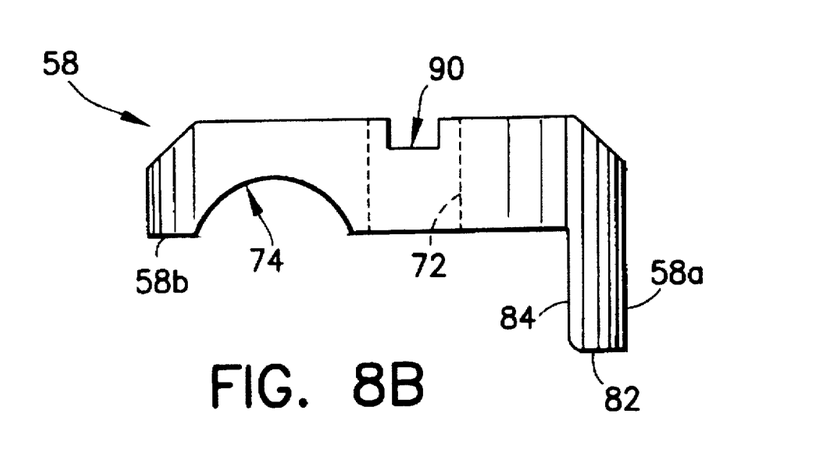

As best seen in FIGS. 8A and 8B, the top plate 58 has a circular unthreaded hole 72 which receives the T-bolt shank 54b. The bottom of the top plate 58 has a radiused groove 74 on one side to fit the sensing line pipe 48, and a downward projecting lip 58a on the opposing side. The lip 58a has a pair of contact surfaces 82 and 84 which are generally mutually perpendicular and contact opposing surfaces 86 and 88 on ledge 60b and shoulder 60d respectively (shown in FIG. 9B). These abutting surfaces, on the side of the anchor 60 opposite to the jet pump sensing line 48, block rotation of the anchor around the jet pump sensing line during nut tightening. Also seating of lip 58a on ledge 60b provides a fulcrum for transfer of clamp preload to the jet pump sensing line 48.

The anchor 60 has a radiused groove 78 on one side to fit the sensing line 48, with an extending tapered projection 60c to facilitate its sliding into engagement with the sensing line during remote assembly. Similarly, the top plate 58 has a radiused groove 74 which fits around the other side of the sensing line. When the nut 56 is fully tightened, as shown in FIG. 4C, the minimum distance between tapered projection 60c of anchor 60 and lip 58b of top plate 58 is less than the outer diameter of the sensing line 48, so that the sensing line is clamped securely and cannot disengage.

Figure 7A:
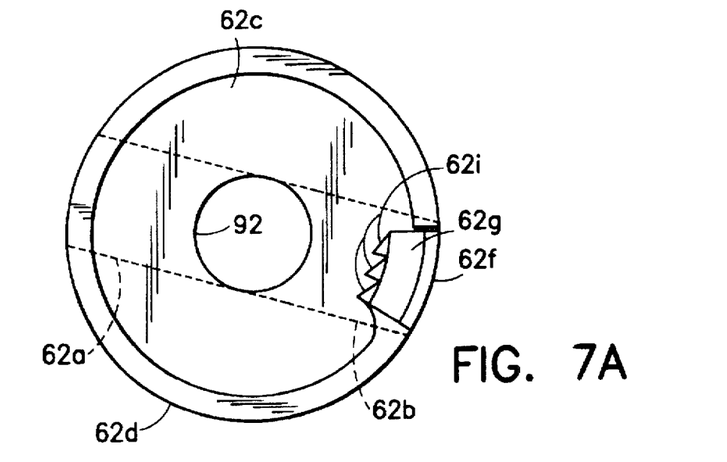
FIGS. 7A–7C are schematics showing top plan and elevation views respectively of the ratchet lock washer in accordance with the preferred embodiment, the elevation view of FIG. 7C being taken at 90° removed from the elevation view of FIG. 7B.
Figure 7B:
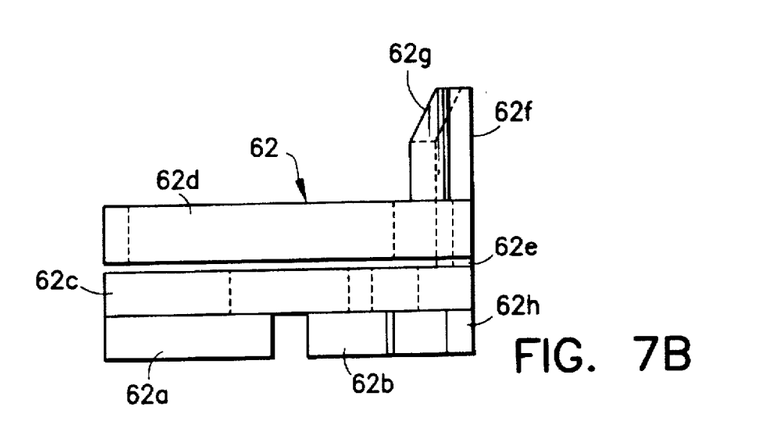
Figure 7C:
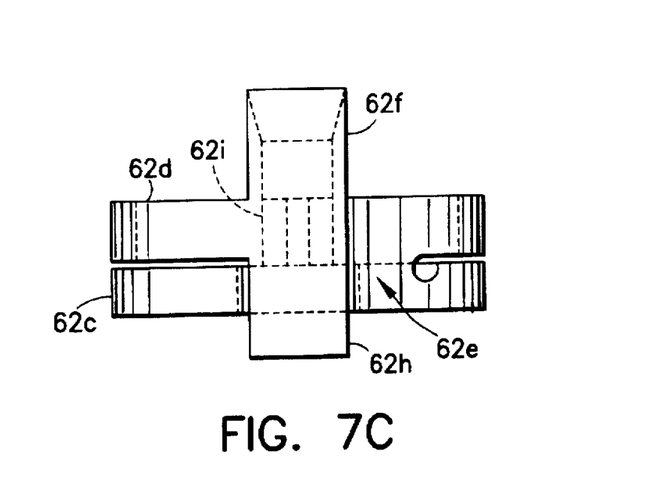

In accordance with the invention, the ratchet nut 56 must be locked to prevent rotation in the direction of loosening. This can be accomplished by any conventional means, e.g., by tack welding the nut to the top plate (not shown). However, in accordance with one preferred embodiment of the invention, a ratchet lock washer 62 is installed between the nut 56 and the top plate 58. As seen in FIGS. 7A–7C, the lock washer 62 comprises a washer 62c having a key 62a, 62b and 62h projecting from the bottom of the washer and form locking in a groove 90 formed in top plate 58. The interlocking engagement of the key and groove 90 prevents rotation of lock washer 62 relative to the top plate 58. As best seen in FIG. 7B, the key consists of two segments 62a and 62b which lie along a diameter of the lock washer and are separated by a gap which is an extension of a circular unthreaded hole 92 in the washer 62c, through which the bolt shank 54b passes.

As shown in detail in FIGS. 7A–7C, the ratchet lock washer 62 further comprises an integral spring arm 62d which encircles the ratchet teeth contour 56b. Spring arm 62d is supported at one end by a ligament 62e which is integrally connected to both the spring arm and the washer 62c. The spring arm is in the shape of a circular arc of about 315°. The distal end of the spring arm has an upward projection 62f and a downward projection 62h, best seen in FIG. 7C. The upward projection 62f has a camming surface 62g, which is impacted by the nut torquing socket which engages the ratchet nut. The downward projection 62h mates with groove 90 in the top plate 58. This prevents circumferential deflection of the spring arm during tightening of the nut that could diminish its anti-rotation performance.

Figure 5A:
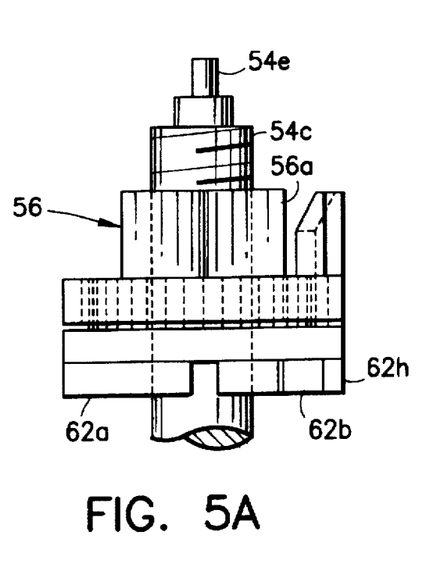
FIGS. 5A and 5B are schematics showing plan and elevation views respectively of the coupled ratchet nut and ratchet lock washer in accordance with the preferred embodiment.
Figure 5B:
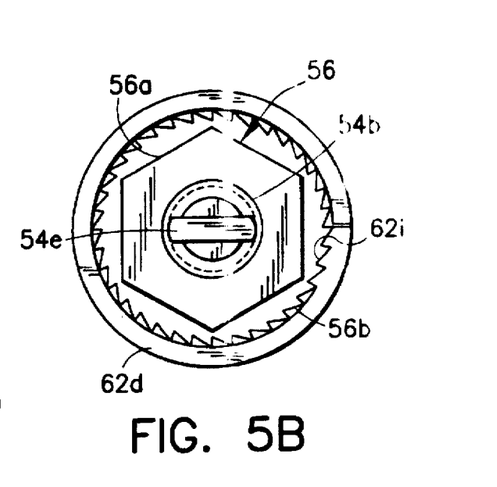

The distal end of the spring arm is further provided with a plurality (e.g., three) of ratchet teeth 62i, shown in FIG. 7A. The ratchet teeth 62i project radially inward and are arranged in sequence along a circumferential line. As seen in FIGS. 5A and 5B, the spring arm surrounds the ratchet tooth contour 56b of the nut 56. When the ratchet teeth 62i of the spring arm are meshed with the ratchet teeth on the nut, the nut cannot rotate in the direction of loosening.

The camming surface 62g is oriented and positioned so that engagement of the torquing tool's nut drive socket deflects the distal end of the spring arm radially outward (not shown). This disengages the spring arm ratchet teeth 62i from the nut ratchet teeth 56b, facilitating either tightening or loosening of the nut. The unlocking torque strength is enhanced by contact at the end of the spring arm, as it is forced against the fixed opposing surface of the ligament 62e.

The preferred embodiment of the invention has been disclosed for the purpose of illustration. Variations and modifications of the disclosed structures which do not depart from the concept of this invention will be readily apparent to mechanical engineers skilled in the art. All such variations and modifications are intended to be encompassed by the claims set forth hereinafter.

I claim:

1. A T-bolt comprising a shank having an axis and a head extending generally perpendicular to said shank axis, said shank comprising a threaded portion and a square portion having a side length, said square portion of said shank being between said head and said threaded portion of said shank, and said head having a length greater than said side length of said square portion of said shank, wherein said head has a smooth rounded convex surface extending from a closed contour lying in a plane perpendicular to said shank axis.

2. A T-bolt comprising a shank having an axis and a head extending generally perpendicular to said shank axis, said shank comprising a threaded portion and a square portion having a side length, said square portion of said shank being between said head and said threaded portion of said shank, and said head having a length greater than said side length of said square portion of said shank, further comprising a T-handle connected to a distal end of said shank.

3. An assembly comprising:
   a T-bolt comprising a shank having an axis and an elongated head extending generally perpendicular to said shank axis, said shank comprising a threaded portion and said head having a length greater than a diameter of said shank;
   a first clamping element having a first recess, a projection with first and second contact surfaces, and a first hole penetrated by a first portion of said shank, said first recess being a cylindrical section having an axis;
   a second clamping element having a second recess, a land, a shoulder, and a second hole penetrated by a second portion of said shank, said second recess being a cylindrical section having an axis generally parallel to said axis of said first recess, said first contact surface of said projection of said first clamping element abutting said land, and said second contact surface of said projection of said first clamping element abutting said shoulder, and said first recess opposing said second recess such that a pipe of predetermined diameter arranged therebetween is thereby clamped; and
   a threaded nut threadably coupled to said threaded portion of said shank, said first and second clamping elements being pressed together by a compressive load applied by said nut when tightened on said T-bolt.

4. The assembly as defined in claim 3, wherein said head of said T-bolt has a planar base surface and a convex surface joined to said base surface along a peripheral junction, said convex surface having a continuously varying slope.

5. The assembly as defined in claim 3, wherein said T-bolt further comprises a T-handle connected to a distal end of said shank.

6. The assembly as defined in claim 3, wherein said T-bolt further comprises a square neck and said second clamping element has a square hole for receiving said square neck with minimal clearance, said square hole communicating with said second hole of said second clamping element.

7. The assembly as defined in claim 3, wherein said second clamping element has a recess for receiving said head of said T-bolt.

8. The assembly as defined in claim 3, further comprising a lock washer arranged between said nut and said first clamping element, said lock washer comprising means for preventing rotation of said nut in a direction of loosening.

9. The assembly as defined in claim 8, wherein said nut comprises a socket drive and a peripheral contour having a multiplicity of ratchet tooth, and said lock washer comprises a spring arm having a plurality of ratchet teeth arranged to mesh with said ratchet teeth on said nut when said spring arm is not flexed away from said nut.

10. The assembly as defined in claim 9, wherein said lock washer further comprises a camming projection connected to said spring arm, said camming projection having a surface which is oblique relative to said shank axis.

11. An assembly comprising:
   a first fastening element comprising a shank having an axis and a head extending generally perpendicular to said shank axis, said shank comprising a threaded portion;
   a second fastening element comprising a threaded hole and a peripheral contour having a multiplicity of ratchet tooth, said threaded hole and said peripheral contour being coaxial, and said threaded portion of said shank of said first fastening element being threadably engaged with said threaded hole of said second fastening element;
   first and second components fastened together means of said first and second fastening elements; and
   a locking element for preventing rotation of said nut in a direction of loosening, said locking element comprising a base and a spring arm supported by said base, said spring arm having a plurality of ratchet teeth arranged to mesh with said ratchet teeth on said nut when said spring arm is not flexed away from said nut.

12. The assembly as defined in claim 11, wherein said first component comprises first anti-rotation means and said locking element comprises second anti-rotation means coupled to said first anti-rotation means of said first component.

13. The assembly as defined in claim 11, wherein said first fastening element comprises a bolt and said second fastening element comprises a nut.

14. The assembly as defined in claim 11, wherein said locking element further comprises a camming projection connected to said spring arm, said camming projection having a surface which is oblique relative to said shank axis.

15. An apparatus comprising:
   a jet pump having an elongated hole having a width and a length formed in a wall thereof;
   a jet pump sensing line; and
   a clamping assembly attached to said jet pump and clamping said jet pump sensing line, wherein said clamping assembly comprises:
      a T-bolt comprising a shank having an axis and an elongated head extending generally perpendicular to said shank axis, said shank comprising a threaded portion and said head having a length greater than a diameter of said shank, greater than said width of said elongated hole and less than said length of said elongated hole;
      a first clamping element having a first recess, a projection with first and second contact surfaces, and a first hole penetrated by a first portion of said shank, said first recess being in contact with said jet pump sensing line;
      a second clamping element having a second recess and a second hole penetrated by a second portion of said shank, said second recess being in contact with said jet pump sensing line and opposing said first recess; and
      a threaded nut threadably coupled to said threaded portion of said shank, said first and second clamping elements being pressed together by a compressive load produced when said nut is tightened on said T-bolt, whereby said jet pump sensing line is clamped.

16. The apparatus as defined in claim 15, wherein said T-bolt further comprises a square neck located in said elongated hole in said jet pump wall and having a side length slightly less than said width of said elongated hole.

17. The apparatus as defined in claim 15, further comprising a lock washer arranged between said nut and said first clamping element, said lock washer comprising means for preventing rotation of said nut in a direction of loosening.

18. The apparatus as defined in claim 17, wherein said nut comprises a socket drive and a peripheral contour having a multiplicity of ratchet tooth, and said lock washer comprises a spring arm having a plurality of ratchet teeth arranged to mesh with said ratchet teeth on said nut when said spring arm is not flexed away from said nut.

19. The apparatus as defined in claim 15, wherein said first clamping element comprises a projection with first and second contact surfaces, and said second clamping element comprises a shoulder and a land, said first contact surface of said projection of said first clamping element abutting said land, and said second contact surface of said projection of said first clamping element abutting said shoulder.

* * * * *